United States Patent
Fevre et al.

(10) Patent No.: US 12,036,719 B2
(45) Date of Patent: Jul. 16, 2024

(54) UNIT FOR HEATING PLASTIC PREFORMS, COMPRISING A DEVICE FOR PROTECTING PREFORM NECKS

(71) Applicant: SIDEL PARTICIPATIONS, Octeville-sur-Mer (FR)

(72) Inventors: Sébastien Fevre, Octeville-sur-Mer (FR); Stéphane Morin, Octeville-sur-Mer (FR)

(73) Assignee: SIDEL PARTICIPATIONS, Octeville-sur-Mer (FR)

( * ) Notice: Subject to any disclaimer, the term of this patent is extended or adjusted under 35 U.S.C. 154(b) by 207 days.

(21) Appl. No.: 17/787,503

(22) PCT Filed: Dec. 18, 2020

(86) PCT No.: PCT/EP2020/087175
§ 371 (c)(1),
(2) Date: Jun. 20, 2022

(87) PCT Pub. No.: WO2021/123275
PCT Pub. Date: Jun. 24, 2021

(65) Prior Publication Data
US 2023/0025422 A1 Jan. 26, 2023

(30) Foreign Application Priority Data
Dec. 20, 2019 (FR) ...................................... 1915080

(51) Int. Cl.
*B29C 49/64* (2006.01)
*B29C 49/68* (2006.01)

(52) U.S. Cl.
CPC ........ *B29C 49/6445* (2013.01); *B29C 49/684* (2022.05)

(58) Field of Classification Search
CPC ..... B29C 49/64; B29C 49/68; B29C 49/6445; B29C 49/684; B29C 49/4205
See application file for complete search history.

(56) References Cited

U.S. PATENT DOCUMENTS

| 2010/0151069 A1* | 6/2010 | Ng ..................... B29C 49/42122 425/150 |
| 2016/0214306 A1* | 7/2016 | Linke .................. B29C 49/4236 |
| 2019/0047206 A1* | 2/2019 | Meyer ................. B29C 49/6409 |

FOREIGN PATENT DOCUMENTS

| AT | 520 U1 | 12/1995 |
| FR | 2950283 A1 | 3/2011 |
| FR | 2950284 A1 | 3/2011 |

OTHER PUBLICATIONS

International search report dated Mar. 18, 2021.

* cited by examiner

*Primary Examiner* — Christopher M Rodd
*Assistant Examiner* — Shibin Liang (57) ABSTRACT

A heating unit for heating preforms made of plastics material and having a flange separating a body and neck. The heating unit comprising a plurality of supports, each bearing a gripping member for gripping the preforms. The supports are movable in the heating unit such that each gripping member moves along a conveying path of the preforms. The heating unit also comprises a plurality of shells secured to the supports, where each shell is connected to one or more supports by an actuating member. The actuating member is mounted on said support to pivot about an axis situated at a distance from the conveying path of the preforms. The heating unit further comprising means for pivoting the actuating member to drive the shell from an open position to (Continued)

a protection position when the support to which said shell is connected is passing from an admission/releasing zone to a holding zone.

16 Claims, 6 Drawing Sheets

UNIT FOR HEATING PLASTIC PREFORMS, COMPRISING A DEVICE FOR PROTECTING PREFORM NECKS

The field of the invention is that of the design and manufacture of containers made of plastics material.

More specifically, the invention relates to a device for protecting preform necks for a preform heating unit.

Conventionally, containers made of plastics material can be obtained by heating a preform made of plastics material above a glass transition temperature.

A preform usually comprises:
- a body, with a shape substantially in the form of a cylinder of revolution about a central axis;
- a neck, which extends in the continuation of the body from a first end thereof, the neck being separated from the body by a flange;
- a bottom, which closes the body at a second end thereof.

By analogy:
- the body of the preform becomes the body of the container;
- the neck of the preform remains unchanged during the shaping process of the container;
- the bottom of the preform becomes the bottom of the container.

The heated preforms are inserted in a mold with the impression of the final container or of an intermediate container, in order to be blown therein by injection of a fluid. More specifically, air is injected into the preform in order to deform it and to stretch the plastics material until it comes into contact with the walls of the mold.

To heat the preforms, use is made of heating units, also referred to as "ovens".

The preforms circulate in procession in the heating units while being held by a spinner, that is to say a finger engaging with the neck, and more specifically with the interior of the neck.

These heating units utilize matrices of light sources, generally laser diodes or halogen lamps, which emit radiation to heat the plastics material, and therefore to soften it to promote stretching and deformation thereof in the mold.

When the preforms are being heated, the neck of the preforms, which generally has the shape of the neck of the final container, is not intended to be heated.

Specifically, heating of the neck entails a risk of deformation which may prevent the proper use of the final container, for example prevent the fitting of a cap to close off the container once it has been filled.

To this end, when the preforms are heated, it is necessary to protect the neck thereof from the radiation of the light sources and from the hot air coming from the light sources. In other words, it is necessary to create a chamber to confine the light radiation and the hot air that are present in the heating unit.

A technique that is widely used consists in positioning the preforms neck down and making the neck of the preforms protrude out of the heating unit.

Reflective screens may be used to reflect the light radiation toward the interior of the heating unit, and therefore to confine it in the heating unit.

Furthermore, thermal conduction, which warms the material from the bottom to the top, has no effect on such heating of the preforms.

However, such a positioning is not without drawbacks.

Specifically, in order to be blown, the preforms are introduced into the molds while being positioned neck up.

It is therefore necessary to turn the preforms over between the heating unit and the molds as the preforms are positioned neck down in the heating unit.

In addition to the time and the mechanical means required for turning over the preforms, the turning-over step may lead to a risk of damage to the preforms.

Specifically, the high manufacturing rates require the preforms to be turned over rapidly, the plastics material of which is soft enough to allow deformation thereof. Thus, the centrifugal force associated with the turning over of the preforms at high speed gives rise to stresses on the preform that may result in the preform being stripped from the gripping member bearing it.

Another known technique consists in positioning the preforms in the heating unit with the neck up.

This makes it possible to avoid the step of turning over the preforms and therefore the risk of damage to the preforms.

To prevent the neck of the preforms from being heated, reflectors, also referred to as shells, are interposed between the preforms and positioned under the flange, that is to say on the side of the body of the preform.

However, such reflectors require the preforms to be removed in a movement in translation along the axis of revolution of the body.

It is therefore necessary to grasp the preforms by their body, and this may lead to deformation of the body. This deformation may then give rise to a risk of deterioration of the containers during their shaping in the molds or, in the worst case, render the shaping of the containers impossible.

Furthermore, the gripping of the preforms by their body may result in localized cooling in the plastics material, for example due to a thermal gradient between temperature of the gripping members and the temperature of the preform.

Such instances of localized cooling may make the blowing of the plastics material in the mold difficult and, in the worst case, give rise to the manufacture of a container that is unfit for being put on the market, notably if the container is intended to contain a beverage of the carbonated type.

Specifically, the carbonic gas contained in the beverage leads to internal pressurization of the container. Incipient breaks, which give rise to zones of low mechanical resistance, may then transform into cracks in the container and cause it to explode.

Furthermore, the removal of the preforms in a single translation requires a large movement in height, that is to say along the axis of the body of the preforms. The heating unit therefore has to have quite large dimensions to allow this movement.

In particular, the aim of the invention is to remedy the drawbacks of the prior art.

More specifically, the aim of the invention is to propose a solution for protecting the necks of the preforms during the heating, and also the integrity of the bodies during the removal of the preforms from the heating unit.

Another aim of the invention is to provide such a solution which allows the preforms to be easily removed from the heating unit.

Yet another aim of the invention is to provide such a solution which allows the high throughput of the prior art to be maintained while limiting the risk of damage to the preforms during their removal.

A further aim of the invention is to provide such a solution which allows a reduction in the bulk of a heating unit relative to a heating unit according to the prior art.

These aims, and others which will become apparent below, are achieved by virtue of the invention, the subject of which is a heating unit for heating preforms made of plastics material comprising a body and a neck that are separated by a flange, the heating unit comprising:

a radiation-emitting light source for heating the preforms;

a plurality of supports each bearing a gripping member for gripping the preforms, the supports being movable in the heating unit in such a way that each gripping member moves along a conveying path of the preforms, the heating unit having an admission/releasing zone in which the supports are moved away from one another, and a holding zone in which the supports are brought closer together, the source being disposed in the vicinity of the holding zone, the heating unit also comprising a plurality of shells secured to the supports, the shells being movable between:

a protection position in which they abut in pairwise fashion so as to together form a surround intended to extend around the body and under the flange of a preform in order to form a barrier to the light radiation in the direction of the neck, an open position in which they are moved away from one another, unit in which each shell is connected to at least one of the supports by an actuating member, the actuating member being mounted on said support so as to pivot about a pivot axis situated at a distance from the conveying path of the preforms, the heating unit further comprising means for driving the actuating member in rotation with respect to the support so as to drive the shell from the open position to the protection position when the support to which said shell is connected is passing from the admission/releasing zone to the holding zone.

Such a heating unit effectively protects the neck of the preforms during the heating of the body while still facilitating the input and the output of the preforms into or out of the heating unit.

Specifically, the open position of the shells facilitates the fitting of transverse removal or insertion means of the preforms for facilitating their removal from, or their insertion into, the heating unit.

In addition, this allows a reduction in the bulk of the heating unit with respect to the prior art as the gripping members are not forced to have to move with the preforms to reach the transverse removal or insertion means that are situated, for example, below or above the supports.

In addition, this allows an increase in the production rates as the preforms can be removed during the procession of the preforms, that is to say in a transverse manner.

According to a first preferred embodiment, the heating unit comprises a chain equipped with a plurality of links, the supports each being mounted on one of the links, and comprises a drive wheel for driving the chain of supports, the wheel having a main axis and each shell having an internal edge extending, with respect to the conveying path of the preforms, on the side of the main rotational axis, and an external edge opposite to the internal edge. In this first embodiment, for each shell, the pivot axis is situated close to the internal edge of the shell, and the means for driving the actuating member in rotation comprise a direct mechanical connection between the actuating member and a second support contiguous with the first support.

"Direct mechanical connection" is understood to mean a connection of mechanical solidarity between a portion of the actuating member and a portion of the second support without passing through one or more mechanical members that would be movable with respect to one another. In other words, the direct mechanical connection does not pass through the links of the chain. However, the direct mechanical connection may pass through an intermediate spacer, bearing, washer, surface coating, or equivalents.

This makes it possible, in a mechanical and automatic manner, to be able to position the shells in their open or protection position when the supports are being moved from the admission/releasing zone to the holding zone only.

Advantageously, for each shell, the mechanical connection between the actuating member and the second support comprises a sliding pivot connection, situated close to the external edge of the shell.

The sliding pivot connection is notably composed of a movement in rotation and of a movement in translation of the actuating member with respect to the second support, along two different axes of movement.

This pivot connection makes it possible to be able to generate a curvilinear movement in translation of the shell, this promoting its opening and notably making it possible to provide a spacing between the external edges of two contiguous shells greater than the spacing between the internal edges of two contiguous shells in the open position of the shells. This then facilitates transverse insertion or removal of the preforms.

Advantageously, the sliding pivot connection is realized by an oblong slot made in the actuating member and a cylindrical finger accommodated in the oblong slot and borne by a second support.

Such an architecture allows the sliding pivot connection to be realized in a simple and precise manner. In addition, this connection, which is purely mechanical, facilitates the movement of the shells solely due to the movement of the supports.

According to a second advantageous embodiment, for each shell, the heating unit comprises a motor member cooperating with the actuating element for moving the shell from its protection position to its open position, or vice versa.

In this case, the actuating member is then connected to a support only by its pivot connections, this making it possible to ensure, independently of the position of the contiguous supports, the movement of the shells from their open position to their protection position, or vice versa.

In this case, each motor member comprises a cam track secured to a frame, and a roller which follows the cam track and which is connected to the actuating member.

The cooperation between the cam track and the roller makes it possible to realize the movement or initiate the rotation of the actuating member with respect to the support on which it is mounted so as to rotate in a precise manner as a function of the position of said support on the frame.

Preferably, each roller is mounted so as to rotate on the actuating member with which it cooperates.

This mounting so as to rotate promotes the movement of the shells in the form of a curvilinear translation, thus promoting the obtaining of an open position of the shells with respect to one another in a precise manner, at the desired moment, in order to facilitate the removal or the insertion of the preforms in a transverse manner.

According to an advantageous aspect, each shell is mounted on an actuating member by removable fixing means.

It is thus possible to be able to remove the shells from the heating unit if required, for example if the neck of the preforms also has to be heated, or for maintenance of the machine, for example.

Preferably, the removable fixing means comprise:
at least one fixing hole made in the actuating member, and
at least one arm which is secured to the shell and which is intended to be inserted in the fixing hole.

Such an architecture promotes rapid mounting or rapid demounting of the shells on or from the heating unit, and more particularly on or from the actuating member.

Furthermore, such a mounting arrangement may be provided with mistake-proofing means for facilitating and ensuring correct fitting of the shells in the heating unit.

Preferably, the actuating member has at least one aperture which is transverse to the fixing hole and which leads into the fixing hole, the arm having a notch intended to come opposite the aperture when the arm is inserted in the fixing hole, and the removable fixing means also comprise a holding member inserted in the aperture, the holding member being intended to cooperate with the notch of the arm so as to prevent the removal of the arm from the fixing hole.

This makes it possible to realize rapid mounting or demounting and to secure the holding of the shells on the actuating member by virtue of the holding member.

Thus, in order to mount or demount a shell, it suffices to retract the holding member in order to insert or extract the arm of the shell into or from the fixing hole, and then to refit the holding member.

Figure 1:
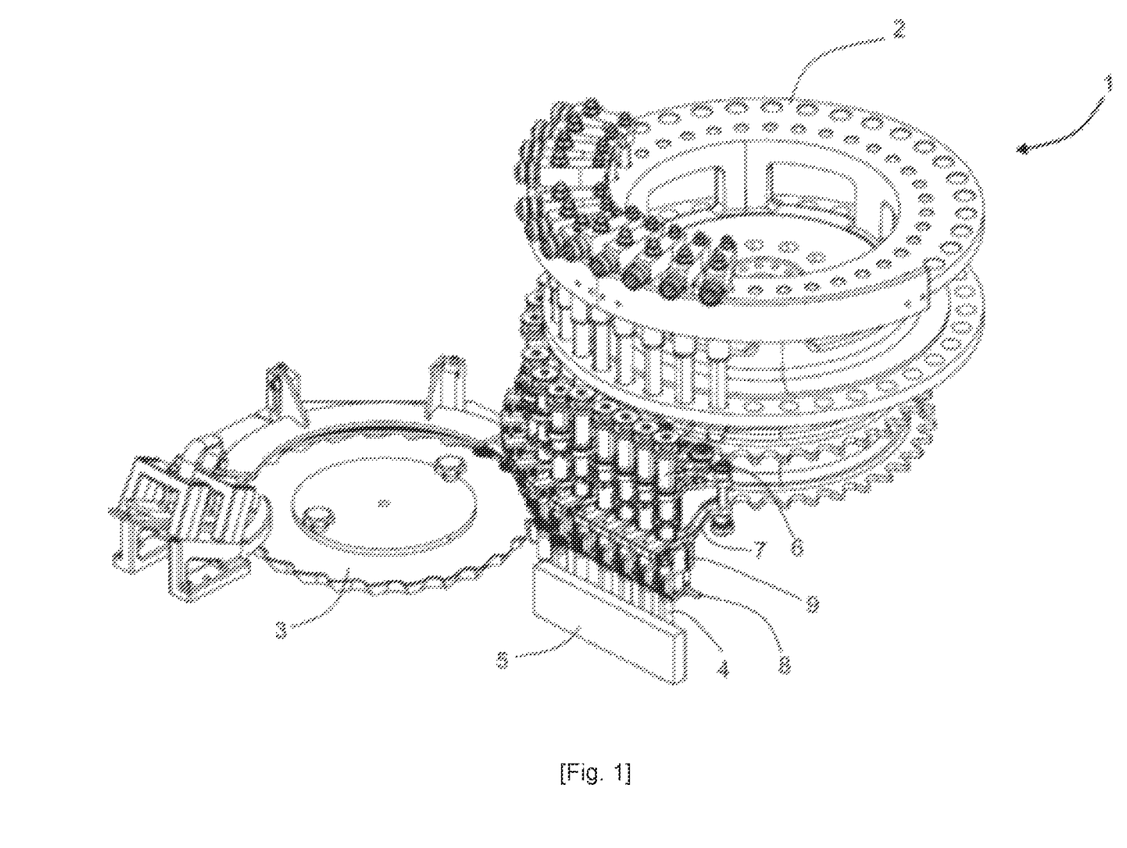
FIG. 1 is a perspective view from above of a part of a heating unit for heating preforms made of plastics material, according to the invention.

Other features and advantages of the invention will become more clearly apparent on reading the following description of a preferential embodiment of the invention, which is given by way of illustrative and nonlimiting example, and the appended drawings in which:

FIG. 1 illustrates a heating unit 1 according to the invention.

More specifically, such a heating unit 1 comprises:
a feed wheel 3 for feeding the preforms 4 into the heating unit 1;
a radiation-emitting light source 5 for heating the preforms 4;
a chain made up of links engaging with the teeth of a drive wheel 2 for driving the chain, which wheel 2 is driven in rotation with respect to a main axis,
a plurality of supports 6 each bearing a gripping member 7 for gripping the preforms 4, each support 6 being fixed to one of the links of the chain, such that the supports are substantially parallel to one another when the corresponding links are a rectilinear portion of the chain, and are moved away from one another when the links turn around the wheel 2;
a plurality of shells 8 secured to the supports 6.

Figure 2:
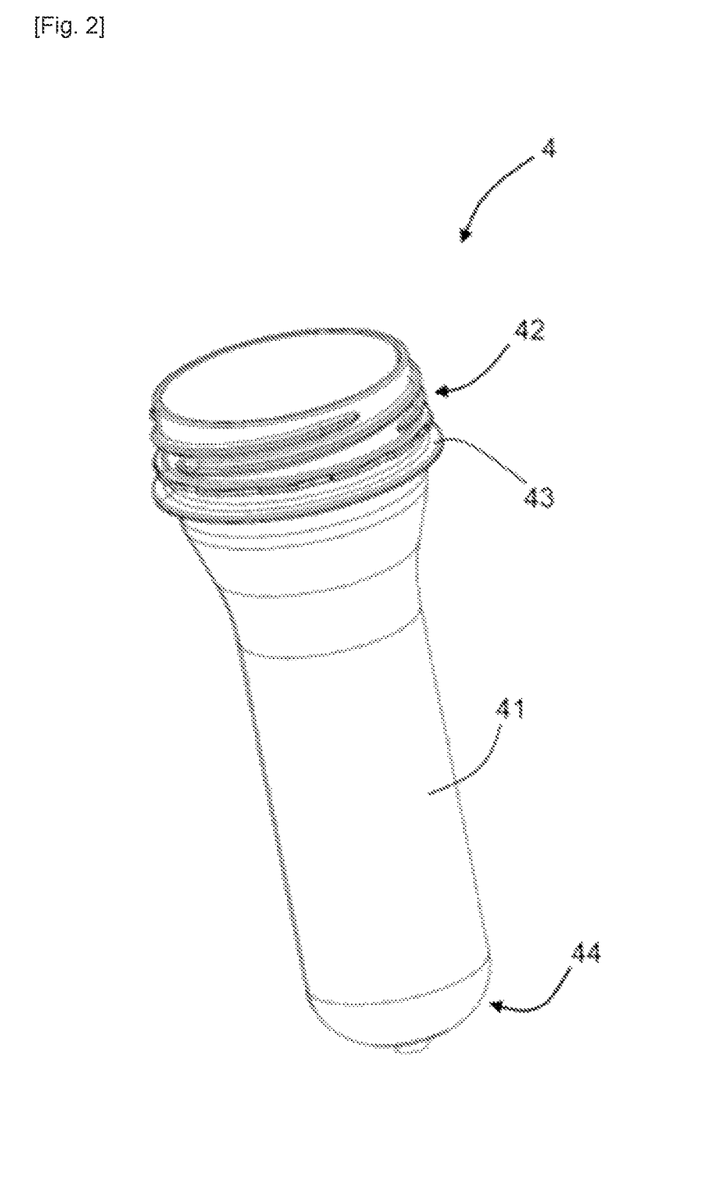
FIG. 2 is a perspective view from above of a preform intended to be heated by the heating unit according to the invention.

With reference to FIG. 2, each preform 4 usually comprises:
a body 41, with a shape substantially in the form of a cylinder of revolution about a central axis X;
a neck 42, which extends in the continuation of the body 41 from a first end thereof, the neck 42 being separated from the body by a flange 43;
a bottom 44, which closes the body at a second end thereof.

By analogy:
the body 41 of the preform 4 becomes the body of the container;
the neck 42 of the preform 4 remains unchanged during the shaping process of the container;
the bottom 44 of the preform 4 becomes the bottom of the container.

The gripping members 7, also referred to as spinners, are in the form of mandrels which are intended to be inserted inside the necks 42 of the preforms 4.

By way of a tight mounting in the necks 42, the gripping members 7 are intended to pick up and hold each preform 4 so as to remove it from the feed wheel 3 and make it move in procession in front of the light source 5.

More particularly, each spinner is mounted on a support 6.

Each of the supports 6 is driven in movement by that link of the chain to which this support is fixed, and thus passes from one zone of the heating unit to the other, namely:
an admission/releasing zone in which the supports 6 are moved away from one another;
a holding zone in which the supports are brought closer together.

In the admission/releasing zone, the gripping members 7 and the supports 6 are situated in the vicinity of the feed wheel 3.

By contrast, in the holding zone, the supports 6 are remote from the wheel 3, notably so as to have the preforms 4 in front of the light source 5.

The passage from one position to the other of the supports 6 takes place notably in a conventional manner by way of a system of cam track and rollers which follow the cam track.

Thus, in a purely mechanical manner, when the heating unit 1 is started up, the supports 6 move in procession. By way of the cam track and the roller to which they are each attached, the supports pass from the admission/releasing zone to the holding zone, and vice versa.

The gripping members 7, for their part, are movable with respect to the support 6 between an upper position and a lower position.

More particularly, in their upper position, the gripping members 7 hold the preforms 4 at a height that is greater than the height at which said preforms are located when they are in the feed wheel 3.

In their lower position, the gripping members 7 allow a preform 4 to be taken up from the feed wheel 3 or allow the preform 4 to be released at the output of the heating unit 1.

By correlation, the gripping members 7 are situated in their upper position when the supports 6 are situated in their holding position. The gripping members 7 are then in their lower position when the supports 6 are situated in their admission/releasing position.

In order to allow the gripping members 7 to pass from their upper position to their lower position, mechanical means such as cam/cam track connections can notably be provided.

In a variant, a pneumatic, electronic or electro-pneumatic actuator may also be provided so as to permit the movability of the gripping members 7.

With reference to FIGS. 3 to 6, the shells 8 and their operation are now described.

The shells 8 reflect the light radiation emitted by the light source 5 in the direction of the body 41 of the preforms 4, in order to protect the neck 42 of the preform 4.

To do this, each shell 8 advantageously has a coating that reflects the light radiation. In a variant, the material that makes up the shells may exhibit light-reflecting properties.

Figure 3:
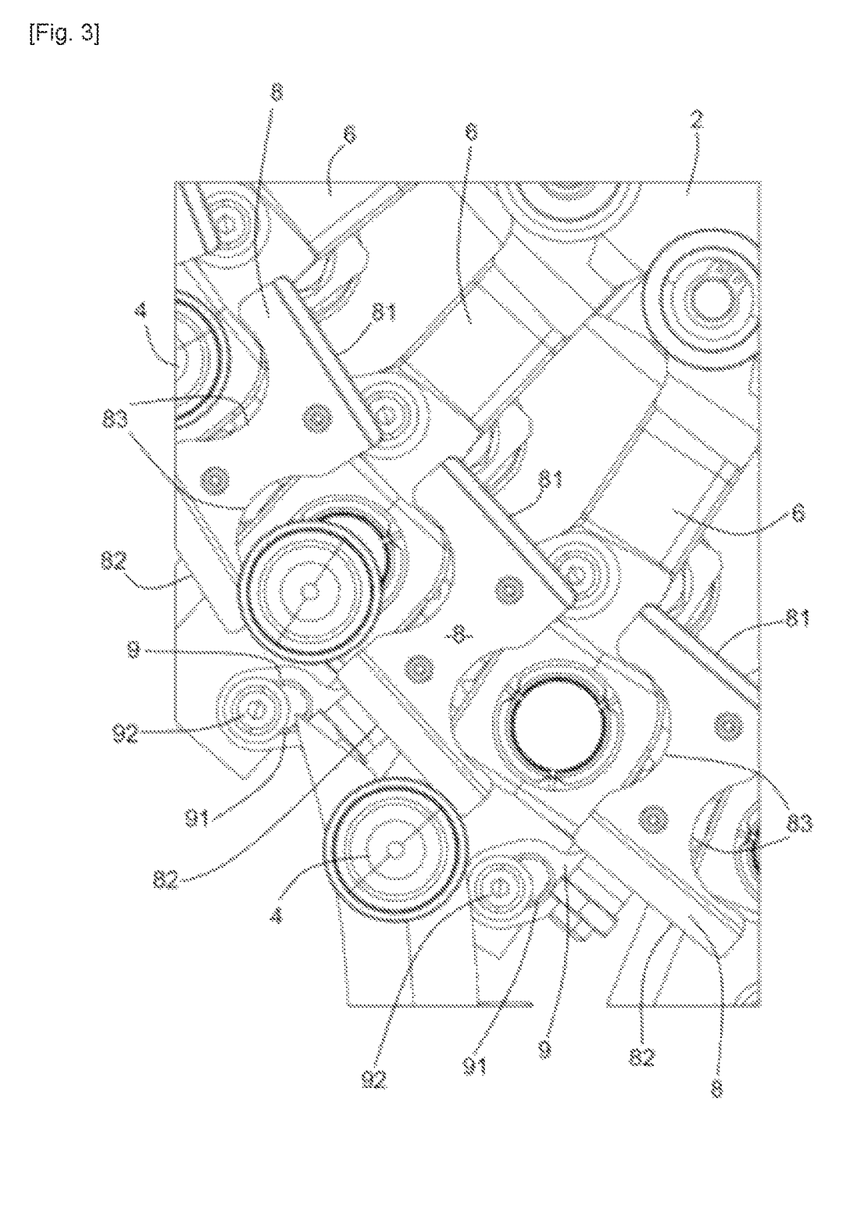
FIG. 3 is a view from below of a part of the heating unit according to the invention, illustrating the protective shells in a first position, referred to as the admission/releasing position.
Figure 4:
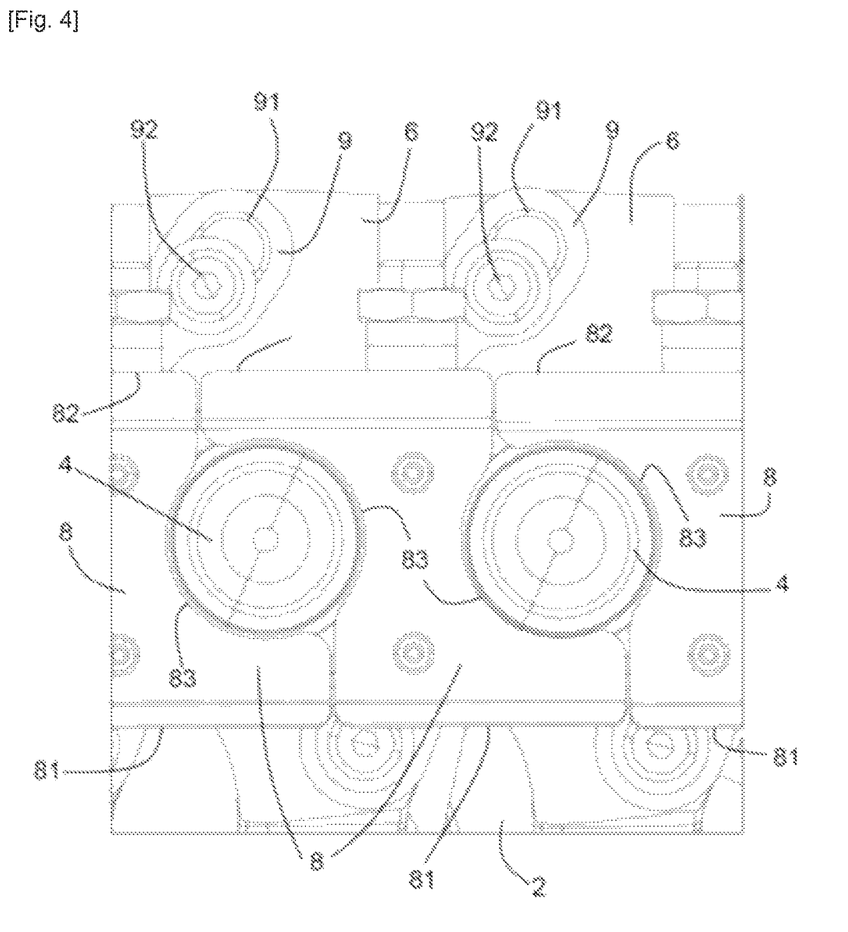
FIG. 4 is a view from below of a part of the heating unit according to the invention, illustrating the protective shells of the preforms in a second position, referred to as the holding position.
Figure 5:
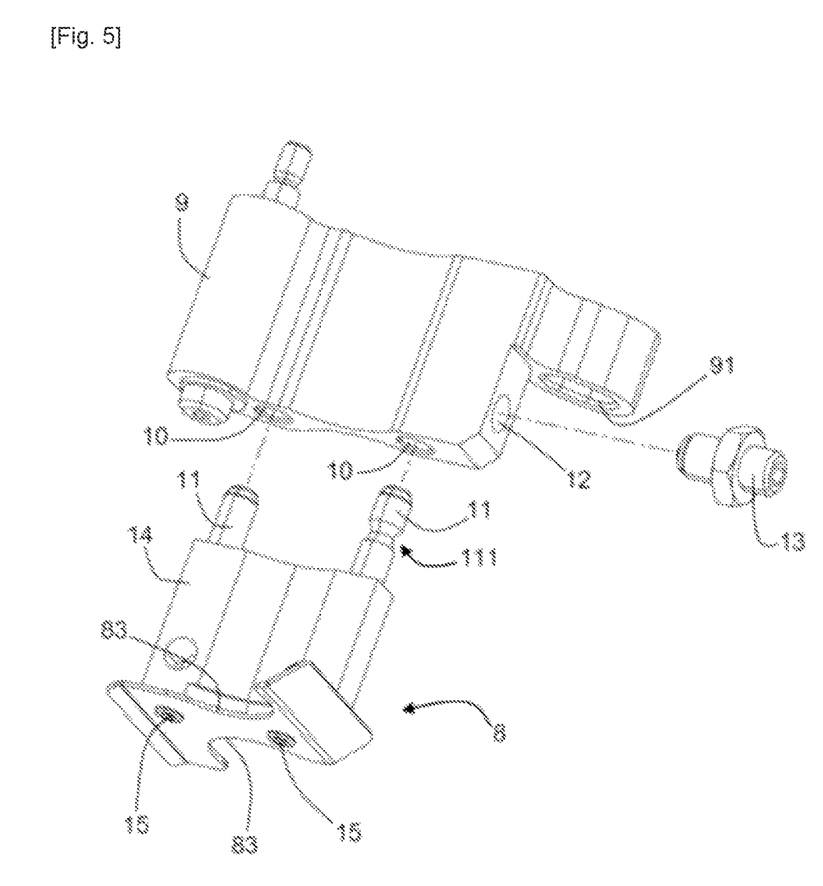
FIG. 5 is a perspective view from above of a shell and of an actuating member on which the shell is mounted.

With reference to FIGS. 3, 4 and 5, each shell 8 has an internal edge 81 that may, as in the illustrated example but in a non-obligatory manner, extend so as to be substantially parallel to the conveying path of the preforms. The internal edge 81 is situated on that side of the conveying path of the preforms which is closest to the main rotational axis of the wheel 2. Each shell 8 also has an external edge 82 opposite to the internal edge 81.

In order to be coupled to a preform 4, each shell 8 has two circular cutouts 83 situated opposite one another and between the internal edge 81 and the external edge 82.

The shells 8 are each mounted on at least one support 6.

Each shell 8 is advantageously movable with respect to its support 6 between:
- a protection position in which they abut in pairwise fashion so as to together form a surround intended to extend around the body 41 and under the flange 43 of a preform 4;
- an open position in which they are moved away from one another.

In their protection position, the shells 8 then form a barrier to the light radiation in the direction of the neck 42.

In order to permit this movability, each shell 8 is connected to at least one support 6 by an actuating member 9.

The actuating member 9 is mounted so as to pivot on said support 6 in the vicinity of the internal edge 81 of the shell 8.

As described below, the actuating member 9 tends to drive the shell 8 from its open position to its protection position when the support 6 to which said shell is connected is passing from its admission/releasing position to its holding position, and vice versa.

According to the first embodiment illustrated in FIGS. 3, 4 and 5, for each shell 8, the actuating member 9 is mounted so as to pivot on a first support 6 and is connected to a second support 6 contiguous with the first support 6 in the vicinity of the external edge 82 of the shell 8.

More specifically, the actuating member 9 is connected to the second support 6 by a sliding pivot connection.

It is emphasized that the sliding pivot connection in this case means a connection allowing both pivoting of the actuating member 9 with respect to the second support 6, but also translation of the actuating member 9 with respect to said second support 6.

However, contrary to the mechanical definition of the sliding pivot connection, the axis of translation and the axis of rotation of the actuating member 9 are, in the present case, different from one another.

Thus, although the movement of the actuating member 9 with respect to the second support 6 is a curvilinear movement in translation, comparable to a planar bearing connection, in mechanical terms, the connection between the actuating member 9 and the second support 6 is considered a sliding pivot connection in the present case.

With reference to FIGS. 3 and 4, the sliding pivot connection is realized by an oblong slot 91 made in the actuating member 9 and a cylindrical finger 92 accommodated in the oblong slot 91 and borne by the second support 6.

According to an embodiment variant that is not illustrated in the figures, the oblong slot 91 may be made in the support 6 and the finger 92 may be borne by the actuating member 9.

When two contiguous supports 6 pass from the admission/releasing zone to the holding zone, or vice versa, the sliding pivot connection and the pivot connection by which the actuating member 9 is connected to each of the two contiguous supports 6 lead to a movement of the shell 8 in the form of a curvilinear movement in translation.

With reference to FIG. 3, the shells 8 are illustrated in their open position.

In this open position, the spacing between the internal edges 81 of two contiguous shells 8 is less than the spacing between the external edges 82 of the same two contiguous shells 8.

This notably makes it easier for the gripping members 7 to take up a preform 4 and notably makes it possible to virtually completely retract the shells 8 so as to allow the loading/unloading of the preforms 4 to input them into, or output them from, the heating unit 1.

As illustrated in FIG. 4, two contiguous shells 8 are illustrated in their protection position.

In this protection position, the internal edges 81 of two contiguous shells 8 and the external edges 82 of two contiguous shells 8 are parallel to one another.

In other words, the distance between the internal edges 81 and the external edges 82 of two contiguous shells 8 is identical.

This allows the shells 8 to be able to surround a preform 4 in pairwise fashion and thus form a barrier to the light radiation emitted by the light source 5 in the direction of the neck 42.

The light radiation then reflects at the shells 8 and is redirected toward the body 41 of the preforms 4 to prevent the neck 42 of the preforms from also being heated. This in fact increases the performance of the heating of the body 41.

With reference to FIG. 5, each shell 8 is mounted on an actuating member 9 by removable fixing means.

To this end, the removable fixing means comprise:
- at least one fixing hole 10 made in the actuating member 9, and
- at least one arm 11 which is secured to the shell 8 and which is intended to be inserted in the fixing hole 10.

More specifically, as illustrated in FIG. 5, the removable fixing means comprise two fixing holes 10 made in the actuating member 9 and two arms 11 which are secured to the shell 8 and which are each intended to be inserted in one of the fixing holes 10.

In order to avoid any unintentional removal of the shell, the actuating member 9 has at least one aperture 12 which is transverse to the fixing hole 10 and which leads into the latter.

More particularly, the removable fixing means and the actuating member 9 have a transverse aperture 12 which leads only into one of the fixing holes 10.

Each arm 11 advantageously has a notch 111 intended to come opposite the aperture 12 when the arm 11 is inserted in the fixing hole 10.

The removable fixing means also comprise a holding member 13 intended to be inserted in the transverse aperture 12.

This holding member 13 is intended to cooperate with the notch 111 of the arm 11 so as to prevent the removal of the arm 11 from the fixing hole 10.

Such removable fixing means notably make it possible, during a maintenance operation or an operation for changing a preform format, to replace the shells 8 in a rapid and easy manner when the latter are intended to be replaced or removed temporarily to allow easy access to the supports or gripping members 7.

Preferably, as illustrated in FIG. 5, each shell 8 comprises a cartridge 14 bearing the arm or arms 11. The fixing of the reflective part of the shell 8 to the cartridge 14 is advantageously realized by means of rivets 15.

Figure 6:
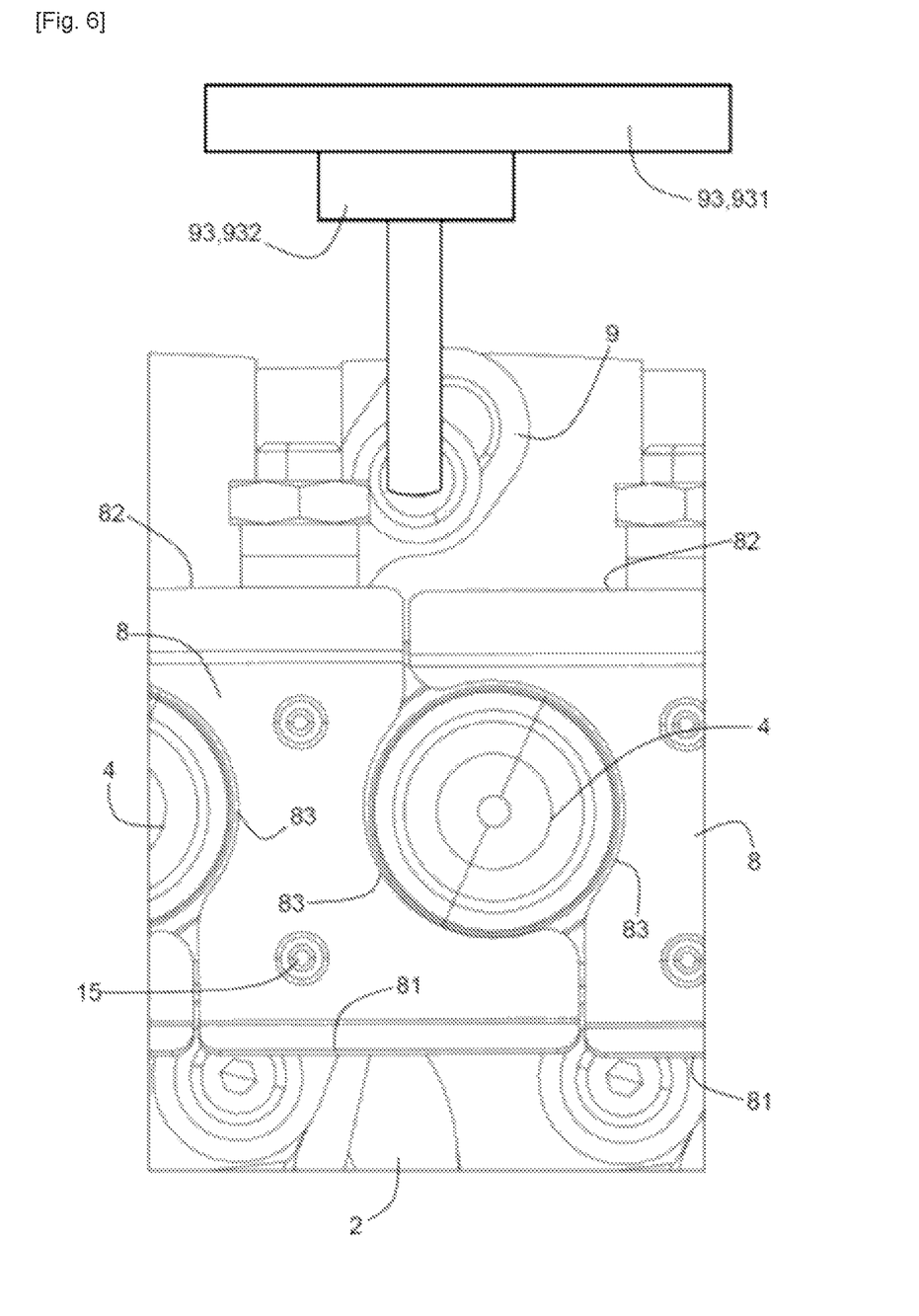
FIG. 6 is a view from below of a part of the heating unit according to the invention, illustrating a different embodiment for driving the actuating member.

According to a second embodiment illustrated in FIG. 6, the heating unit 1 comprises a motor member 93 which is secured to the frame 2 and which is intended to cooperate with the actuating member.

More specifically, the motor member 93 comprises a cam track 931 secured to the frame 2, and a roller 932 which is connected to the actuating member 9 and which is intended to follow the cam track 931. More specifically, each roller 932 is mounted so as to rotate on the actuating member 9 with which it cooperates.

Thus, when the supports 6 move from their admission/releasing position to their holding position, the roller 932, by following the cam track 931, brings about the rotation about the pivot connection of the shell 8, so as to allow said shell to pass from its open position to its protection position, or vice versa.

The heating unit 1 which has just been described makes it possible to protect the necks 42 during the heating of the body 41 of the preforms 4, while still allowing easy loading and unloading of the preforms 4 before and after heating thereof.

More specifically, the spacing between the external edges 82 of the shells 8 in their open position facilitates the output or the input of the preforms 4 from or into the heating unit 1, notably by allowing the preforms to be admitted or removed in a transverse manner, that is to say perpendicularly with respect to the axis of rotation of the spinners, or in a virtually transverse manner.

This then makes it possible to avoid any risk of damage to the preforms 4, which are at their glass transition temperature, that is to say softened and easily deformable, in the event of a shock, for example.

A shock or slight deformation could then lead to a risk of defects in the final container once it has been shaped, or even to the inability to shape a container from the deformed preform 4.

The invention claimed is:

1. A heating unit (1) for heating preforms (4) made of plastics material comprising a body (41) and a neck (42) that are separated by a flange (43), the heating unit (1) comprising:
    a radiation-emitting light source (5) for heating the preforms (4);
    a plurality of supports (6) each bearing a gripping member (7) for gripping the preforms (4), the supports (6) being movable in the heating unit in such a way that each gripping member moves along a conveying path of the preforms,
    an admission/releasing zone in which the supports are moved away from one another;
    a holding zone in which the supports are brought closer together, the source being disposed in the vicinity of the holding zone,
the heating unit (1) also comprising a plurality of shells (8) secured to the supports (6), the shells (8) being movable between:
    a protection position in which they abut in pairwise fashion so as to together form a surround intended to extend around the body (41) and under the flange (43) of a preform (4) in order to form a barrier to the light radiation in the direction of the neck (42), and
    an open position in which they are moved away from one another,
wherein each shell (8) is connected to at least one of the supports (6) by an actuating member (9), the actuating member (9) being mounted on said support (6) so as to pivot about a pivot axis situated at a distance from the conveying path of the preforms, the heating unit further comprising means for driving the actuating member in rotation with respect to the support so as to drive the shell (8) from the open position to the protection position when the support (6) to which said shell is connected is passing from the admission/releasing zone to the holding zone.

2. The heating unit (1) as claimed in claim 1, further comprising a chain equipped with a plurality of links, the supports each being mounted on one of the links, and comprises a drive wheel for driving the chain of supports, the wheel having a main axis and each shell (8) having an internal edge (81) extending, with respect to the conveying path of the preforms, on the side of the main rotational axis, and an external edge (82) opposite to the internal edge (81), and
    wherein, for each shell (8), the pivot axis is situated close to the internal edge (81) of the shell (8), and the means for driving the actuating member in rotation comprise a direct mechanical connection between the actuating member and a second support (6) contiguous with the first support (6).

3. The heating unit (1) as claimed in claim 2, wherein each shell (8) is mounted on the corresponding actuating member (9) by removable fixing means.

4. The heating unit (1) as claimed in claim 2, wherein, for each shell (8), the mechanical connection between the actuating member (9) and the second support (6) comprises a sliding pivot connection, situated close to the external edge (82) of the shell (8).

5. The heating unit (1) as claimed in claim 4, wherein each shell (8) is mounted on the corresponding actuating member (9) by removable fixing means.

6. The heating unit (1) as claimed in claim 4, wherein the sliding pivot connection comprises an oblong slot (91) made in the actuating member (9) and a cylindrical finger (92) accommodated in the oblong slot (91) and borne by the second support (6).

7. The heating unit (1) as claimed in claim 6, wherein each shell (8) is mounted on the corresponding actuating member (9) by removable fixing means.

8. The heating unit (1) as claimed in claim 1, wherein, for each shell (8), the heating unit (1) further comprises a motor member (93) cooperating with the actuating element (9) for moving the shell (8) from its protection position to its open position, or vice versa.

9. The heating unit (1) as claimed in claim 8, wherein each shell (8) is mounted on the corresponding actuating member (9) by removable fixing means.

10. The heating unit (1) as claimed in claim 8, wherein each motor member (93) comprises a cam track (931) secured to a frame, and a roller (932) which follows the cam track (931) and which is connected to the actuating member (9).

11. The heating unit (1) as claimed in claim 10, wherein each shell (8) is mounted on the corresponding actuating member (9) by removable fixing means.

12. The heating unit (1) as claimed in claim 10, wherein each roller (932) is mounted so as to rotate on the actuating member (9) with which it cooperates.

13. The heating unit (1) as claimed in claim 12, wherein each shell (8) is mounted on the corresponding actuating member (9) by removable fixing means.

14. The heating unit (1) as claimed in claim 1, wherein each shell (8) is mounted on the corresponding actuating member (9) by removable fixing means.

15. The heating unit (1) as claimed in claim 14, wherein the removable fixing means comprise:
   at least one fixing hole (10) made in the actuating member (9), and
   at least one arm (11) which is secured to the shell (8) and which is intended to be inserted in the fixing hole (10).

16. The heating unit (1) as claimed in claim 15, wherein:
   the actuating member (9) has at least one aperture (12) which is transverse to the fixing hole (10) and which leads into the fixing hole (10);
   the arm (11) has a notch (111) intended to come opposite the aperture (12) when the arm (11) is inserted in the fixing hole (10),
   and wherein the removable fixing means also comprise a holding member (13) inserted in the aperture (12), the holding member (13) being intended to cooperate with the notch (111) of the arm (11) so as to prevent the removal of the arm (11) from the fixing hole (10).

* * * * *